(12) United States Patent
Brieschke (10) Patent No.: US 10,449,643 B2
(45) Date of Patent: Oct. 22, 2019

(54) SNAP RING INSERTION APPARATUS

(71) Applicant: Aries Engineering Company, Inc., Dundee, MI (US)

(72) Inventor: Mark A. Brieschke, Ida, MI (US)

(73) Assignee: Aries Engineering Company, Inc., Dundee, MI (US)

( * ) Notice: Subject to any disclaimer, the term of this patent is extended or adjusted under 35 U.S.C. 154(b) by 61 days.

(21) Appl. No.: 15/909,099

(22) Filed: Mar. 1, 2018

(65) Prior Publication Data

US 2019/0270169 A1  Sep. 5, 2019

(51) Int. Cl.
*B23P 19/08* (2006.01)
*B25B 27/20* (2006.01)

(52) U.S. Cl.
CPC .......... *B23P 19/084* (2013.01); *B25B 27/20* (2013.01); *Y10T 29/49947* (2015.01); *Y10T 29/536* (2015.01); *Y10T 29/5383* (2015.01); *Y10T 29/5387* (2015.01); *Y10T 29/53783* (2015.01)

(58) Field of Classification Search
CPC ...... B25B 27/20; B23P 19/084; Y10T 29/536; Y10T 29/5383; Y10T 29/5387; Y10T 29/49947
See application file for complete search history.

(56) References Cited

U.S. PATENT DOCUMENTS

| | | | |
|---|---|---|---|
| 3,694,043 A | 9/1972 | Tellson | |
| 3,718,350 A | 2/1973 | Klein | |
| 4,175,310 A | 11/1979 | Boyd | |
| 4,242,775 A | 1/1981 | Eickmann | |
| 4,789,351 A | 12/1988 | Fisher, Jr. et al. | |
| 4,911,726 A | 3/1990 | Warkentin | |
| 5,343,607 A | 9/1994 | Southerland, Jr. et al. | |
| 6,507,985 B1 | 1/2003 | Loughlin et al. | |
| 6,640,405 B2 | 11/2003 | Ino | |
| 6,722,011 B1 | 4/2004 | Bacon | |
| 6,789,313 B2 | 9/2004 | Hendricks | |
| 7,080,432 B2 | 7/2006 | Norwood | |
| 8,505,176 B2 | 8/2013 | Ueda et al. | |
| 9,179,989 B2 | 11/2015 | Mullaly | |
| 9,205,521 B2 | 12/2015 | Firsoff et al. | |
| 2007/0124920 A1* | 6/2007 | Kim | B23P 19/084 29/709 |
| 2010/0050417 A1 | 3/2010 | Stomski | |
| 2013/0291957 A1* | 11/2013 | Di | B25B 27/0028 137/315.01 |

* cited by examiner

*Primary Examiner* — Jermie E Cozart
(74) *Attorney, Agent, or Firm* — MacMillan, Sobanski & Todd, LLC (57) ABSTRACT

A snap ring insertion apparatus is provided and configured to install a snap ring on a structural member. The snap ring insertion apparatus includes a pneumatic cylinder assembly configured to receive compressed gas and transfer a power of an expansion of the compressed gas to linear movement of a rod. An insertion assembly is coupled to the rod. The insertion assembly has an expander pin and a plurality of fingers pivotably coupled to a finger support member. The finger support member is coupled to the rod in a manner such that linear movement of the rod provides linear movement of the expander pin and pivoting movement of the fingers. Pivoting movement of the fingers results in engagement of the fingers with a snap ring and further pivoting of the fingers results in an expansion of the snap ring in a radial direction.

20 Claims, 8 Drawing Sheets

SNAP RING INSERTION APPARATUS

BACKGROUND

A snap ring is a type of fastener or retaining ring consisting of a semi-flexible metal ring with open ends. The open ends can be expanded to allow the ring to be snapped into place into a machined groove on a dowel pin or other part. Once installed, the snap ring can be configured to permit rotation of the parts, but prevent lateral movement of the parts relative to each other. Snap rings are commonly referred to with different names including the non-limiting examples of C-clip, Seeger ring, Jesus clip or circlip.

Snap rings have two basic forms depending on the application. Internal snap rings are fitted into an internal circumferential bore. Whereas, external snap rings are fitted over a shaft.

Snap rings can be formed as stamped, sheet metal members. In certain instances, the stamped members can have a smooth side and a rough side. The snap ring is typically installed with the smooth side facing the part and the rough side facing in an outward direction, which prevents damage to the part. Wet or dry lubrication is recommended to reduce friction against the snap ring and maintain function.

Snap rings are designed for manual installation or removal with specially shaped plier tips. While snap rings are effective in retaining parts together, the installation of snap rings can be slow, labor intensive and prone to failures.

It would be advantageous if the processes for inserting a snap ring can be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the snap ring insertion apparatus.

The above objects as well as other objects not specifically enumerated are achieved by a snap ring insertion apparatus configured to install a snap ring on a structural member. The snap ring insertion apparatus includes a pneumatic cylinder assembly configured to receive compressed gas and transfer a power of an expansion of the compressed gas to linear movement of a rod. An insertion assembly is coupled to the rod. The insertion assembly has an expander pin and a plurality of fingers pivotably coupled to a finger support member. The finger support member is coupled to the rod in a manner such that linear movement of the rod provides linear movement of the expander pin and pivoting movement of the fingers. Pivoting movement of the fingers results in engagement of the fingers with a snap ring and further pivoting of the fingers results in an expansion of the snap ring in a radial direction.

There is also provided a method of using a snap ring insertion apparatus to insert a snap ring into a groove of a structural member. The method includes the steps of producing linear movement of a rod with a pneumatic cylinder assembly configured to receive compressed gas and transfer a power of an expansion of the compressed gas to linear movement of the rod, connecting the rod to an insertion assembly, the insertion assembly having an expander pin and a plurality of fingers pivotably coupled to a finger support member, moving the expander pin in a linear direction with the rod, pivoting the plurality of fingers with the expander pin, expanding a diameter of the snap ring in a radial direction with the pivoting of the plurality of fingers thereby forming an expanded snap ring and moving the structural member into a position to receive the expanded snap ring.

Various objects and advantages of the snap ring insertion apparatus will become apparent to those skilled in the art from the following detailed description, when read in light of the accompanying drawings.

DETAILED DESCRIPTION

The snap ring insertion apparatus will now be described with occasional reference to specific embodiments. The snap ring insertion apparatus may, however, be embodied in different forms and should not be construed as limited to the embodiments set forth herein. Rather, these embodiments are provided so that this disclosure will be thorough and complete, and will fully convey the scope of the snap ring insertion apparatus to those skilled in the art.

Unless otherwise defined, all technical and scientific terms used herein have the same meaning as commonly understood by one of ordinary skill in the art to which the snap ring insertion apparatus belongs. The terminology used in the description of the snap ring insertion apparatus is for describing particular embodiments only and is not intended to be limiting of the snap ring insertion apparatus. As used in the description of the snap ring insertion apparatus and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the snap ring insertion apparatus. Notwithstanding that the numerical ranges and parameters setting forth the broad scope of the snap ring insertion apparatus are approximations, the numerical values set forth in the specific examples are reported as precisely as possible. Any numerical values, however, inherently contain certain errors necessarily resulting from error found in their respective measurements.

The description and figures disclose a snap ring insertion apparatus. Generally, the snap ring apparatus is configured use a pneumatic cylinder assembly to expand the diameter of a snap ring in a manner that the expanded snap ring can be received by a corresponding groove of a structural member. The snap ring apparatus includes a plurality of pivotable fingers configured to engage inner portions of the snap ring and expand the snap ring in a radial direction as the fingers pivot in an outward direction.

Figure 1:
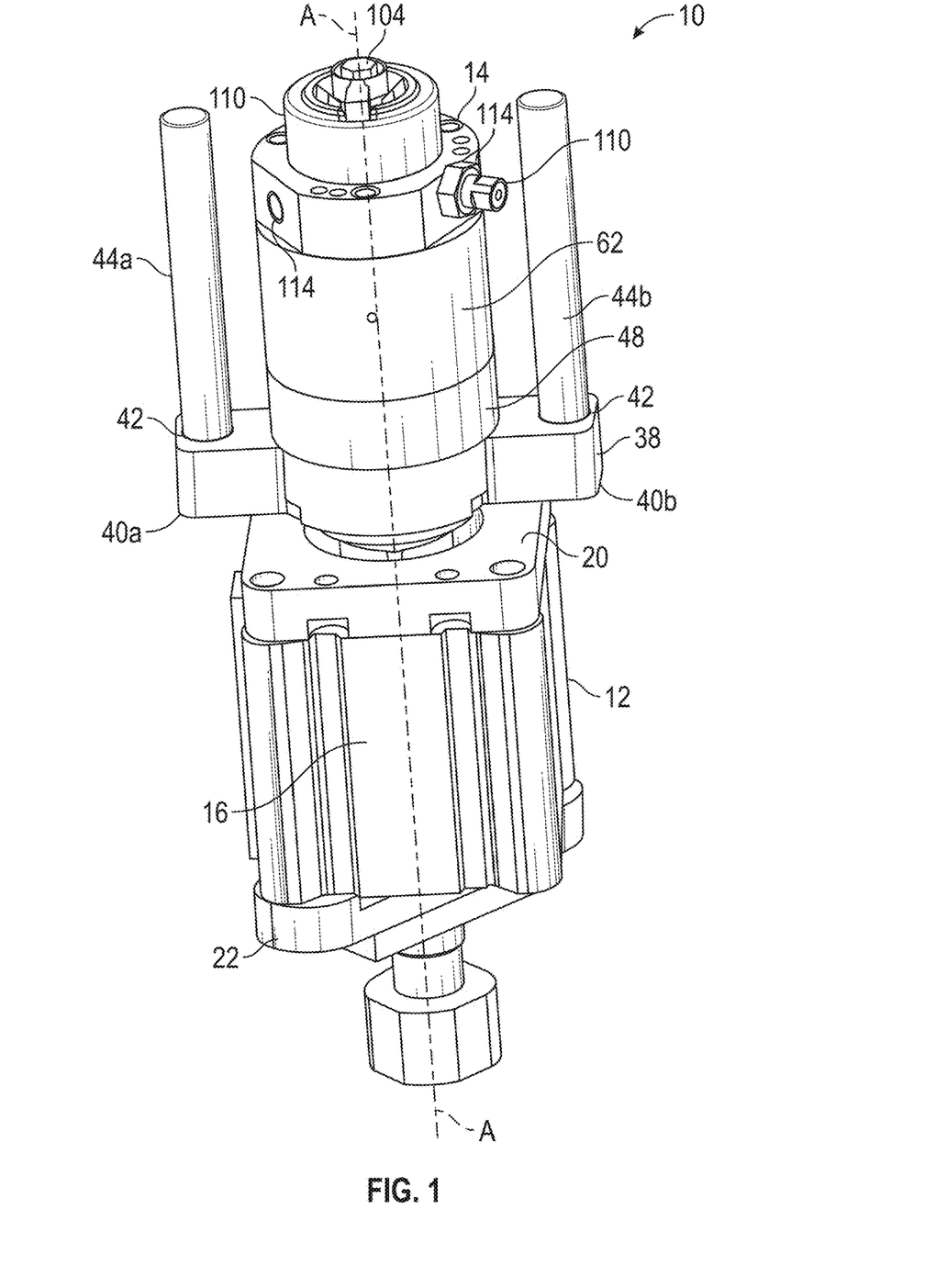
FIG. 1 is a perspective view of a snap ring insertion apparatus.
Figure 2:
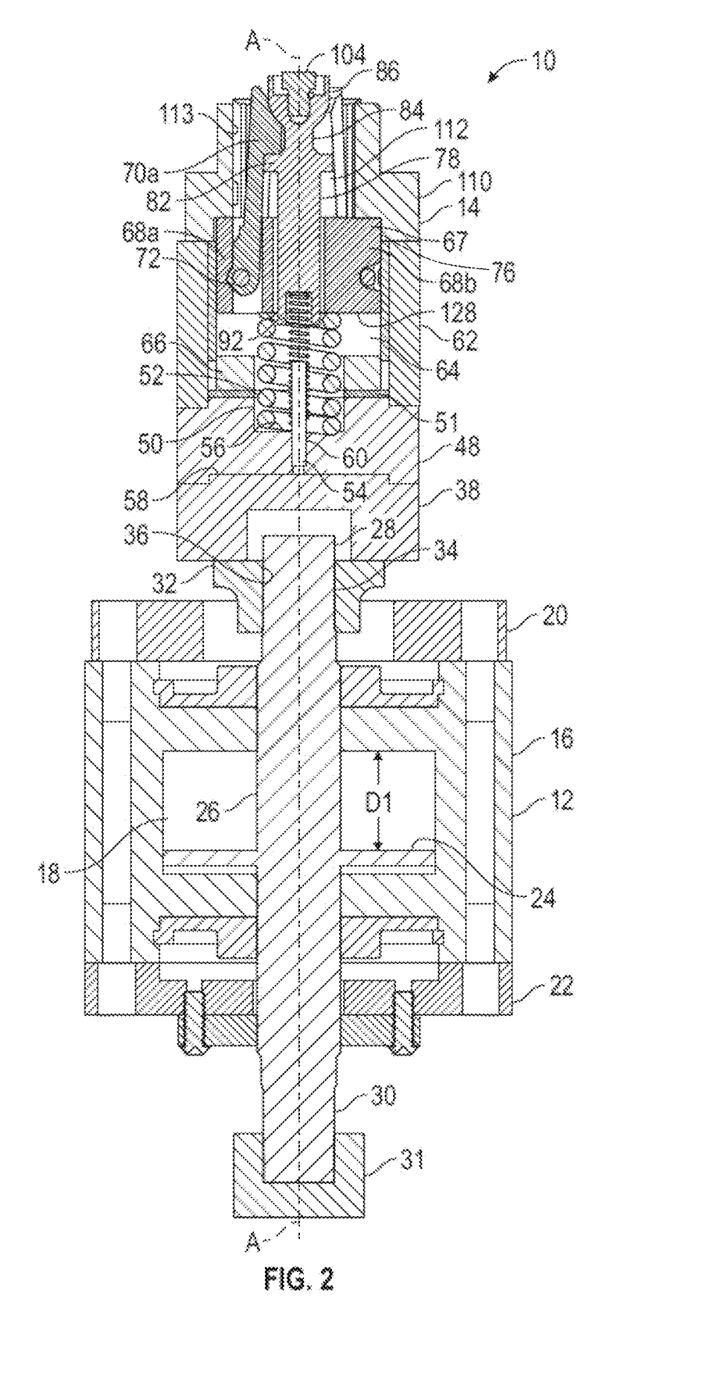
FIG. 2 is a front view, in cross-section, of the snap ring insertion apparatus of FIG. 1.
Figure 3:
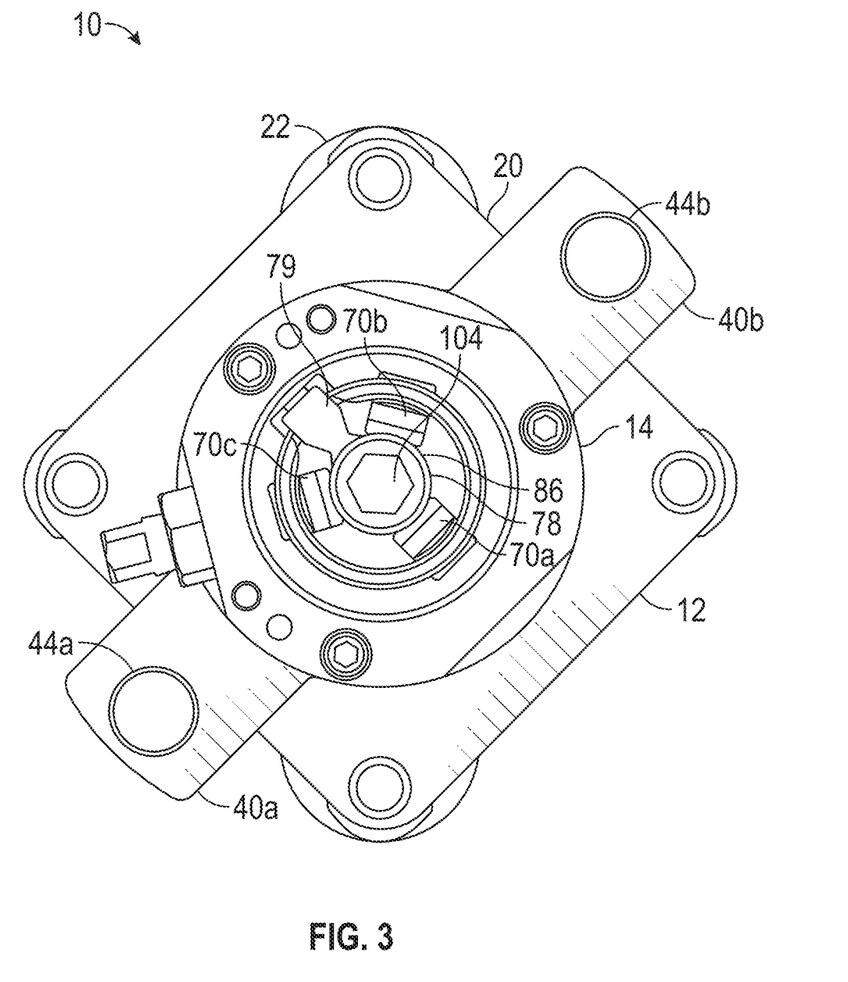
FIG. 3 is a plan view of the snap ring insertion apparatus of FIG. 1.

Referring now to FIGS. 1-3, a representative embodiment of a snap ring insertion apparatus (hereafter "insertion apparatus" is illustrated generally at 10. The insertion apparatus 10 includes a pneumatic cylinder assembly 12 operably coupled to an insertion assembly 14.

Referring again to FIGS. 1-3, the pneumatic cylinder assembly 12, also commonly called an air cylinder, is conventional in the art and will only be briefly described herein. The pneumatic cylinder assembly 12 is configured to use the power of a compressed gas to produce a force and movement in a reciprocating linear motion. The pneumatic cylinder assembly 12 includes a body 16 configured to define an internal bore 18. The body 16 is capped at a first end by a cylinder riser plate 20 and at the opposing end by a cylinder stop mount 22.

Referring now to FIG. 2, the internal bore 18 extends in a longitudinal direction and is centered about longitudinal axis A-A. A piston 24 is disposed within the internal bore 18 and is configured to move axially within the bore 18, as shown by direction arrow D1. The piston 24 is configured to transfer the power of an expanding compressed gas received within the internal bore 18 to produce a force and movement in the reciprocating linear direction D1. In the illustrated embodiment, the piston 24 has the form of a flat disc. However, in other embodiments, the piston 24 can have other forms, such as the non-limiting example of a cylinder, sufficient to transfer the power of an expanding compressed gas received within the internal bore 18 to produce a force and movement in the reciprocating linear direction D1.

Referring again to FIG. 2, the piston 24 is attached to a rod 26. The piston 24 and the rod 26 are attached together such that linear movement of the piston 24 in direction D1 results in linear movement of the rod 26 in direction D1. The rod 26 has a first end 28 and an opposing second end 30, and is centered about longitudinal axis A-A.

While the embodiment illustrated in FIGS. 1-3 show the pneumatic cylinder assembly 12 configured to use the power of a compressed gas to produce a force and movement of the rod 26 in a reciprocating linear motion, it should be appreciated that in other embodiments, other structures, mechanisms and devices can be used, such as the non-limiting example of a hydraulic cylinder.

Referring again to FIG. 2, the first end 28 of the rod 26 is coupled to a cylinder coupler 32 such that linear movement of the rod 26 results in linear movement of the cylinder coupler 32. In the illustrated embodiment, an outer circumferential surface 34 of the first end 28 of the rod 26 is threaded and received within a threaded aperture 36 extending through the cylinder coupler 32. However, in other embodiments, the first end 28 of the rod 26 can be coupled to a cylinder coupler 32 with other structures, mechanisms and devices.

Referring again to FIG. 2, the second end 30 of the rod 26 is threadably connected to a stop structure 31 such that movement of the rod 26 results in movement of the stop structure 31. The stop structure 31 is configured to limit the travel of the rod 26 in a direction toward the insertion assembly 14. In operation, as the rod 26 travels in a direction toward the insertion assembly 14, the stop structure 31 approaches and finally contacts a lower surface of the lower stop mount 22, thereby limiting the travel of the rod 26 in a direction toward the insertion assembly 14. In the illustrated embodiment, the stop structure 31 has the form of a cylinder. However, in other embodiments, the stop structure can have other forms sufficient to approach and contact a lower surface of the lower stop mount 22, thereby limiting the travel of the rod 26 in a direction toward the insertion assembly 14.

Referring now to FIGS. 1 and 2, the cylinder coupler 32 is attached to a shaft mount 38 such that linear movement of the cylinder coupler 32 results in linear movement of the shaft mount 38. The shaft mount 38 is configured to transfer linear movement of the first end 28 of the rod 26 to the insertion assembly 14. In the illustrated embodiment, the cylinder coupler 32 is attached to the shaft mount 38 with threaded fasteners (not shown for purposes of clarity). However, in other embodiments, the cylinder coupler 32 is attached to the shaft mount 38 with other structures, mechanisms and devices. The shaft mount 38 is centered about longitudinal axis A-A.

Referring now to FIG. 1, optionally the shaft mount 38 can include a plurality of wings 40a, 40b configured to extend in a radial direction from the shaft mount 38. Each of the wings 40a, 40b includes an aperture 42 configured to receive a guidepost 44a, 44b. The guideposts 44a, 44b are configured to extend in a direction substantially parallel the longitudinal axis A-A. The guideposts 44a, 44b are further configured to guide linear movement of the insertion assembly 14. While the embodiment of the shaft mount 38 shown in FIG. 1 illustrates the structure of the optional wings 40a, 40b and the associated guide posts 44a, 44b, in alternate embodiments, other structures, mechanisms and devices can be used to guide linear movement of the insertion assembly 14. It should also be appreciated that the structure of the optional wings 40a, 40b and the associated guideposts 44a, 44b are optional and not required for successful operation of the snap ring insertion apparatus 10.

Referring again to FIGS. 1 and 2, the shaft mount 38 is connected to a lower housing 48. The lower housing 48 includes a first recess 50 disposed within the interior of the lower housing 48. The first recess 50 is centered about longitudinal axis A-A and extends from an upper surface 51 of the lower housing 48 in a direction toward the pneumatic cylinder assembly 12. The first recess 50 is configured to receive a first spring member 52. The first spring member 52 will be discussed in more detail below.

Referring again to FIG. 2, the lower housing 48 includes a second recess 54 disposed within the interior of the lower housing 48. The second recess 54 is centered about longitudinal axis A-A and extends from a lower surface 56 of the first recess 50 to a lower surface 58 of the lower housing 48. The second recess 54 is configured to receive a pin member 60. The pin member 60 will be discussed in more detail below.

Referring now to FIGS. 1 and 2, the lower housing 48 is configured to support an intermediate housing 62. The intermediate housing 62 defines a first internal cavity 64. An internal stop member 66 is disposed within the first internal cavity 64. The internal stop member 66 has the form of a hollow cylinder, with one side positioned adjacent the upper surface 51 of the lower housing 48. The intermediate housing 62 is centered about longitudinal axis A-A. The internal stop member 66 will be discussed in more detail below.

Figure 4:
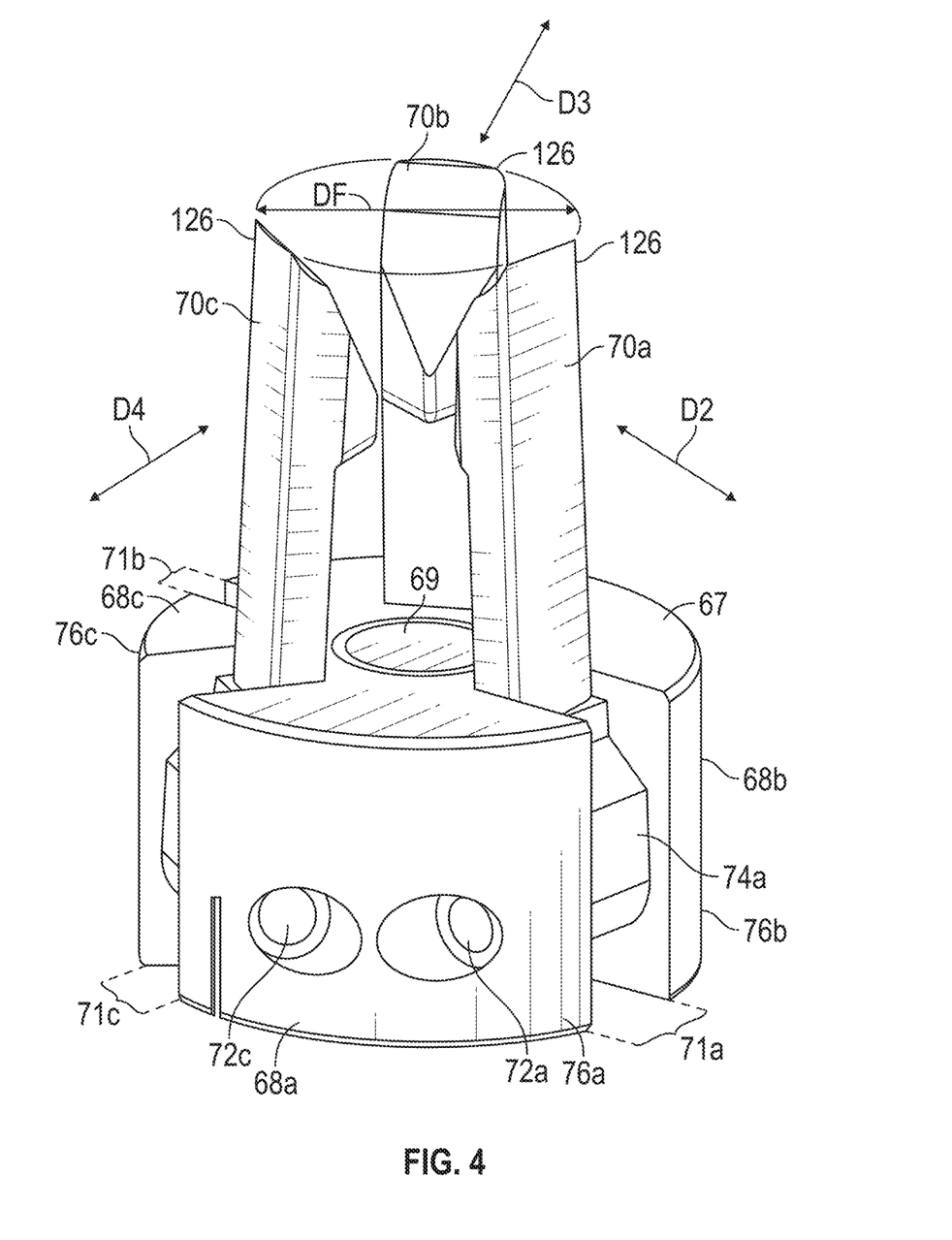
FIG. 4 is a perspective view of a finger support member supporting a plurality of fingers of the snap ring insertion apparatus of FIG. 1.

Referring now to FIGS. 2, 3 and 4, a finger support member 67 is arranged within the first internal cavity 64. The finger support member 67 includes a plurality of spaced apart support segments 68a-68c radially extending from a center aperture 69. The support segments 68a-68c separated from each other by slots 71a-71c. The support segments 68a-68c and the slots 71a-71c are configured such that a finger 70a-70c (a lone finger 70a is illustrated in FIG. 2 for purposes of clarity) is positioned in the slots 71a-71c.

Referring now to FIG. 4, a first support shaft 72a spans the slot 71a and is seated in the adjacent support segments 68a and 68b. The first support shaft 72a is configured to receive a lower portion 74a of the finger 70a in a pivoting arrangement such that the finger 70a can rotate about the first support shaft 72a in the reciprocating directions indicated by direction arrow D2. In a similar manner, a second support shaft (not shown) spans the slot 71b and is seated in the adjacent support segments 68b and 68c. The second support shaft is configured to receive a lower portion of the finger 70b in a pivoting arrangement such that the finger 70b can rotate about the second support shaft in the reciprocating directions indicated by direction arrow D3. Finally, a third support shaft 72c spans the slot 71c and seats in the adjacent support segments 68c and 68a. The third support shaft 72c is configured to receive a lower portion 74c of the finger 70c in a pivoting arrangement such that the finger 70c can rotate about the third support shaft 72c in the reciprocating directions indicated by direction arrow D4.

Referring again to FIGS. 1, 2 and 4, the first internal cavity 64 defined by the intermediate housing 62 has a circular cross-sectional shape. The finger support member 67 has an outer surface 76 that cooperates with the circular cross-sectional shape of the first internal cavity 64 such that the finger support member 67 is guided for axial movement within the first internal cavity 64. In the illustrated embodiment, the outer surface 76 has a circular cross-sectional shape. In alternate embodiments, the outer surface 76 can have other cross-sectional shapes, sufficient to cooperate with the circular cross-sectional shape of the first internal cavity 64 such that the finger support member 67 can be guided for axial movement within the first internal cavity 64.

Figure 5:
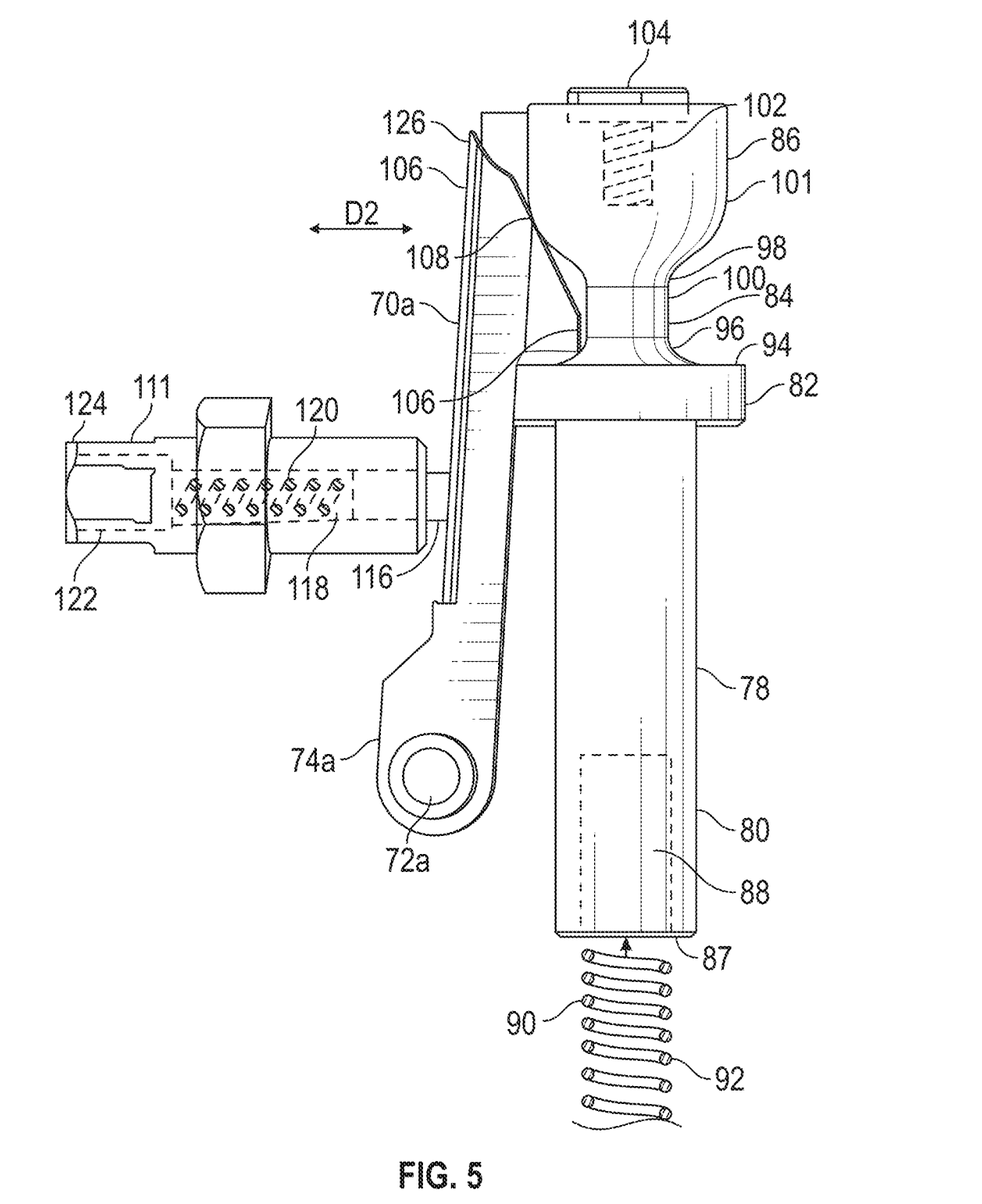
FIG. 5 is a front view of an expander pin and adjuster assembly engaging a finger of the snap ring insertion apparatus of FIG. 1.

Referring now to FIGS. 2 and 5, an expander pin 78 has a lower portion 80, a collar 82, a neck portion 84 and an upper portion 86. The lower portion 80 has the form of a cylinder and is configured for insertion into the center aperture 69 of the finger supporting member 67. The lower portion 80 of the expander pin 78 cooperates with the center aperture 69 of the finger supporting member 67 such that the center aperture 69 guides axial movement of the expander pin 78. The lower portion 80 includes a lower surface 87. An internal cavity 88 extends inward from the lower surface 87. The internal cavity 88 has a cylindrical shape configured to receive an upper portion 90 of a second spring member 92. The second spring member 92 will be discussed in more detail below.

Referring again to FIGS. 2 and 5, the lower portion of the expander pin 78 extends from the lower surface 87 to the collar 82. The collar 82 extends in a radial direction from the lower portion 78. The collar 82 forms an upper surface 94 configured to engage a portion of one of the fingers 70a-70c. The collar 82 will be discussed in more detail below.

Referring again to FIGS. 2 and 5, the neck portion 84 of the expander pin 78 is disposed between the collar 82 and the upper portion 86. The neck portion 84 includes an inwardly radiused lower segment 96 extending in an upward direction from the upper surface 94 of the collar 82, an inwardly radiused upper segment 98 extending in a downward direction from the upper portion 86 and an intermediate segment 100 connecting the inwardly radiused lower and upper segments 96, 98.

Referring again to FIGS. 2 and 5, the upper portion 86 of the expander pin 78 includes an outwardly radiused outer surface 101 and a threaded aperture 102 configured to receive an adjusting member 104. In the illustrated embodiment, the adjusting member 104 is a hex head cap screw. In alternate embodiments, the adjusting member 104 can be other desired structures.

Referring now to FIG. 3, optionally, the upper portion 86 of the expander pin 78 can include a locating fixture 79. The locating fixture 79 is configured to span an opening in the snap ring, thereby arranging the snap ring opening in a desired orientation. In the illustrated embodiment, the locating fixture 79 has a substantially rectangular cross-sectional shape. However, in other embodiments, the locating fixture 79 can have other cross-sectional shapes sufficient to span an opening in the snap ring and arrange the snap ring opening in a desired orientation.

Referring now to FIG. 5, the finger 70a, first support shaft 72a and the expander pin 78 are illustrated. As discussed above, the lower portion 74a of the finger 70a is configured to pivot about the first support shaft 72a, thereby resulting in movement of an upper portion 106 of the finger 70a in directions D2. The upper portion 106 of the finger 70a includes an outwardly radiused projection 106 extending from an angled surface 108. As will be described in more detail below, the outwardly radiused projection 106 of the finger 70a is configured to seat against the inwardly radiused lower segment 96 of the neck portion 84 of the expander pin 78 and the angled surface 108 of the finger 70a is configured to contact the outwardly radiused outer surface 101 of the upper portion 86 of the expander pin 78.

Referring now to FIGS. 1 and 2, a nesting structure 110 is supported by the intermediate housing 62. The nesting structure 110 defines a second internal cavity 112. An internal circumferential wall 113 of the nesting structure 110 is configured to support the collar 82 of the expander pin 78 such that the expander pin 78 can move in axial directions therewithin. The internal circumferential wall 113 is further configured to house the neck portion 84 and upper portion 86 of the expander pin 78 and the outwardly radiused projection 106 and angled surface 108 of the fingers 70a-70c. The nesting structure 110 is centered about the longitudinal axis A-A.

Referring again to FIGS. 1, 4 and 5, an adjuster assembly 111 connects to and extends through a threaded aperture in the internal circumferential wall 113 of the nesting structure 110 (for purposes of clarity, a lone adjuster assembly 111 is illustrated in FIG. 1). The adjuster assembly 111 includes an end segment 116 configured for contact with a portion of the finger 70a. A portion of the end segment 116 is disposed within an internal passage 118 and is in contact with a spring member 120, also disposed within the internal passage 118. An adjuster head 122 is threaded disposed in an end portion 124 of the internal passage 118 and is configured to engage the spring member 120 such as to urge the spring member 120 into contact with the end segment 116. In operation, the adjuster assembly 111 is configured to control an outward travel of a tip 126 of the finger 70a such that the plurality of fingers 70a-70c form a desired tip diameter DF.

Referring again to FIG. 2 as discussed above, the first spring member 52 is disposed in the first recess 50. The first spring member 52 extends from the lower housing 48 to a lower surface 128 of the finger support member 67. The first spring member 52 is configured to resist movement of the expander pin 78 in a downward direction. The first spring member 52 is centered about the longitudinal axis A-A.

Referring again to FIG. 2 as discussed above, the pin member 60 is disposed within the second recess 54 and extends in an upward direction toward the expander pin 78. The pin member 60 is configured to support the second spring member 92 in a manner such that the second spring member 92 can bias the expander pin 78 in an upward direction.

Referring again to FIG. 2 as discussed above, the internal stop member 66 is disposed within the first internal cavity 64. The internal stop member 66 is configured for contact with the lower surface 128 of the finger support member 67 and further configured to resist the continued movement of the finger support member 67 in a downward direction.

Figure 6:
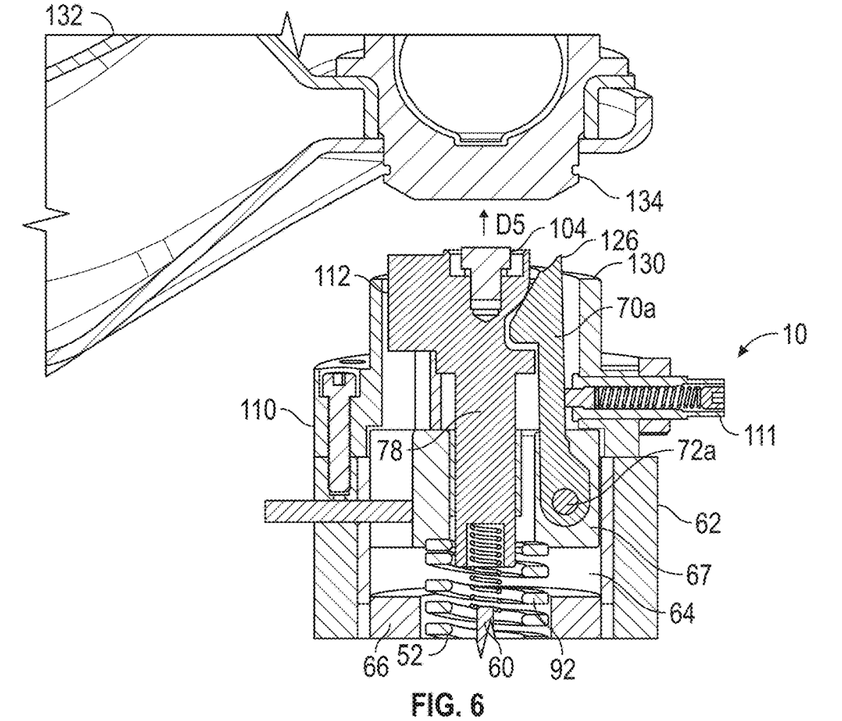
FIG. 6 is a front view of the snap ring insertion apparatus of FIG. 1 illustrating a first step in a snap ring installation process.

Referring now to FIG. 6-11, operation of the insertion apparatus 10 will now be described. Referring first to FIG. 6, the insertion apparatus 10 includes the intermediate housing 62 and the nesting structure 110. The first spring member 52, internal stop member 66 and finger support member 67 are disposed within the first internal cavity 64. The finger support member 67 supports the plurality of fingers 70a-70c (a lone finger 70a is illustrated for purposes of clarity). The finger 70a is supported for rotation about first support shaft 72a. The pin member 60 extends in an upward direction and supports the second spring member 92. The second spring member 92 extends into the internal cavity 88 in the expander pin 78. The expander pin 78 extends in an upward direction into the second internal cavity 112 formed within the nesting structure 110. The adjusting members 111 (a lone adjusting member 111 is illustrated for purposes of clarity) are threaded into the nesting structure 110 in a manner such as to engage the fingers 70a-70c.

Referring again to FIG. 6 in an initial operational step, a snap ring 130 is positioned atop the expander pin 78. In this position, the tips 126 of the fingers 70a-70c are located within an inner surface of the snap ring 130 and the angled surface 108 of the finger 70a is seated against the radiused outer surface 101 of the upper portion 86 of the expander pin 78. In this position, the first spring member 52 maintains tension against the finger support member 67, thereby forcing the finger support member 67 into contact with the nesting structure 110.

Referring again to FIG. 6 in a next step, a structure member 132 is positioned adjacent to the insertion apparatus 10. The structural member 132 includes a snap ring groove 134 configured to receive the snap ring 130. In a next step, the insertion apparatus 10 is driven in a direction toward the structural member 132 by the pneumatic cylinder assembly (not shown) as indicated by direction arrow D5.

Figure 7:
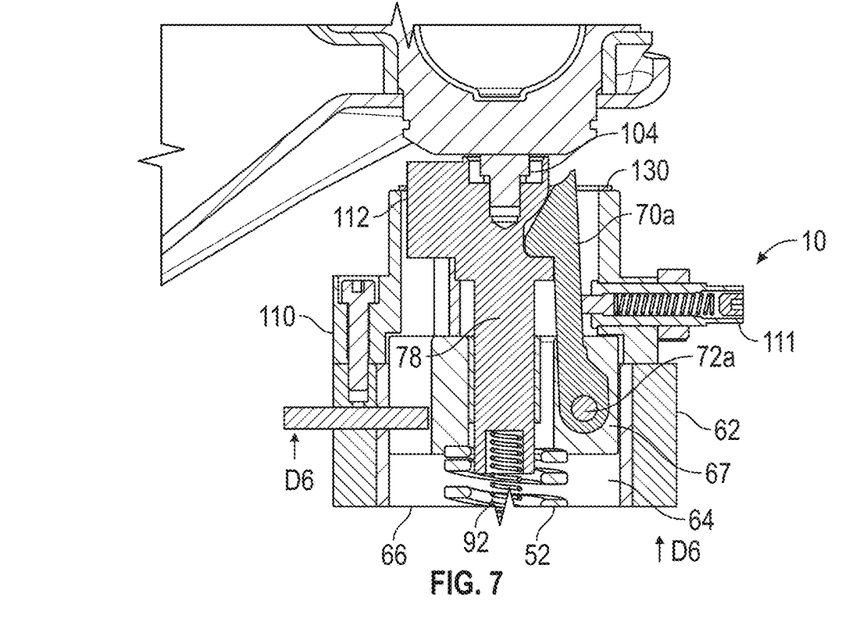
FIG. 7 is a front view of the snap ring insertion apparatus of FIG. 1 illustrating a next step in the snap ring installation process.

Referring now to FIG. 7 in a next step, the insertion apparatus 10 continues to move toward the structural member 132 until the adjusting member 104 contacts a lower surface of the structural member 132. Contact of the adjusting member 104 with the lower surface of the structural member 132 causes movement of the expander member 78 to stop, however, upward movement of the finger support member 67, fingers 70a-70c, intermediate housing 62 and nesting structure 110 continues as shown by direction arrows D6. The tension caused by the first spring member 52 maintains contact of the adjusting member 104 with the lower surface of the structural member 132.

Figure 8:
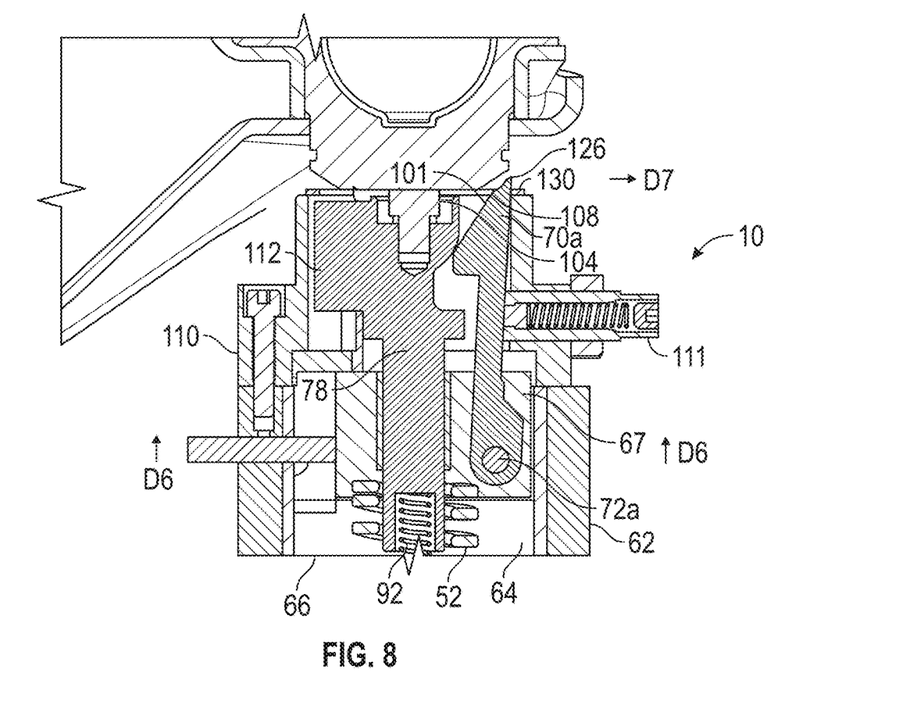
FIG. 8 is a front view of the snap ring insertion apparatus of FIG. 1 illustrating a next step in the snap ring installation process.

Referring now to FIG. 8 in a next step, as the finger support member 67, fingers 70a-70c, intermediate housing 62 and nesting structure 110 continue to advance in an upward direction as indicated by direction arrows D6, the angled surface 108 of the finger 70a is forced in an outward direction by the radiused outer surface 101 of the expander pin 78. In this manner, the fingers 70a-70c are rotated about the support shafts 72a-72c and the tips 126 of the fingers 70a-70c are forced in an outward direction, as indicated by direction arrow D7. As the tips 126 of the fingers 70a-70c are forced in an outward direction, the tips 126 contact the snap ring 130 and force the snap ring 130 to expand in a radial direction.

Figure 9:
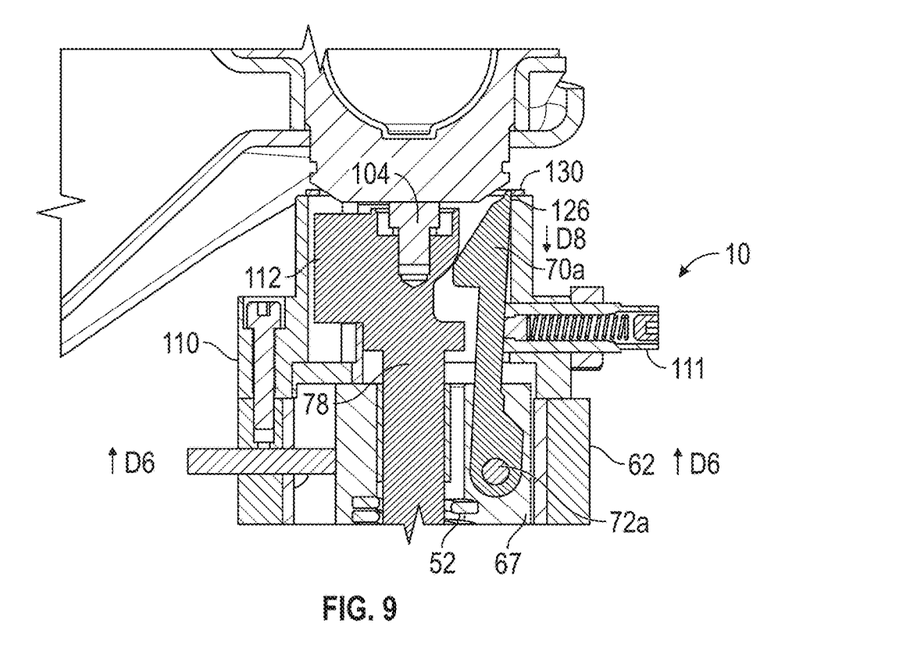
FIG. 9 is a front view of the snap ring insertion apparatus of FIG. 1 illustrating a next step in the snap ring installation process.

Referring now to FIG. 9, the intermediate housing 62 and nesting structure 110 continue to advance in an upward direction as indicated by direction arrows D6. The fingers 70a-70c continue to rotate about the support shafts 72a-72c until the tips 126 of the fingers 70a-70c rotate in an outward direction until the tips 126 seat against the nesting structure 110. Continued advance of the intermediate housing 62 and nesting structure 110 in an upward direction as indicated by direction arrows D6 causes the finger support member 67 and the fingers 70a-70c to retract in a downward direction as indicated by direction arrows D8.

Figure 10:
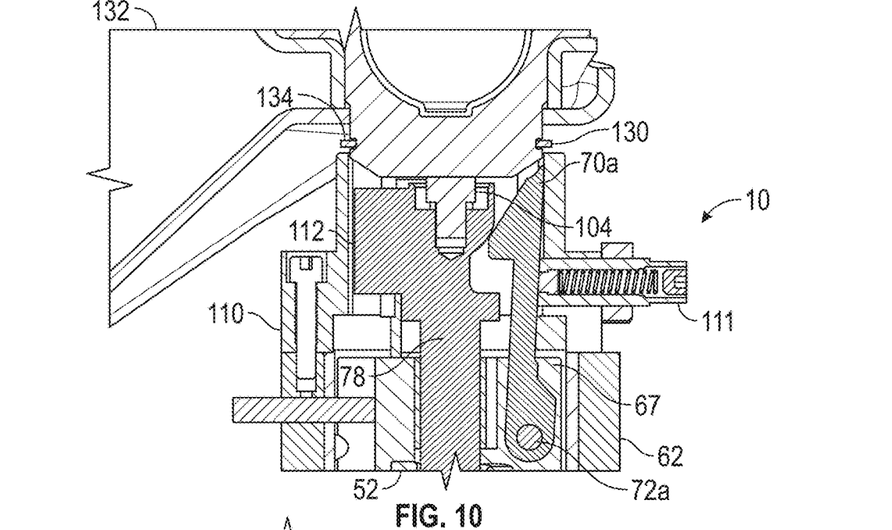
FIG. 10 is a front view of the snap ring insertion apparatus of FIG. 1 illustrating a next step in the snap ring installation process.

Referring now to FIG. 10, the intermediate housing 62 and nesting structure 110 continue to advance in an upward direction and the fingers 70a-70c continue to travel in a downward direction until the groove 134 of the structural member 132 is on the same plane as the snap ring 130. In a next step, the groove 134 receives the snap ring 130.

Figure 11:
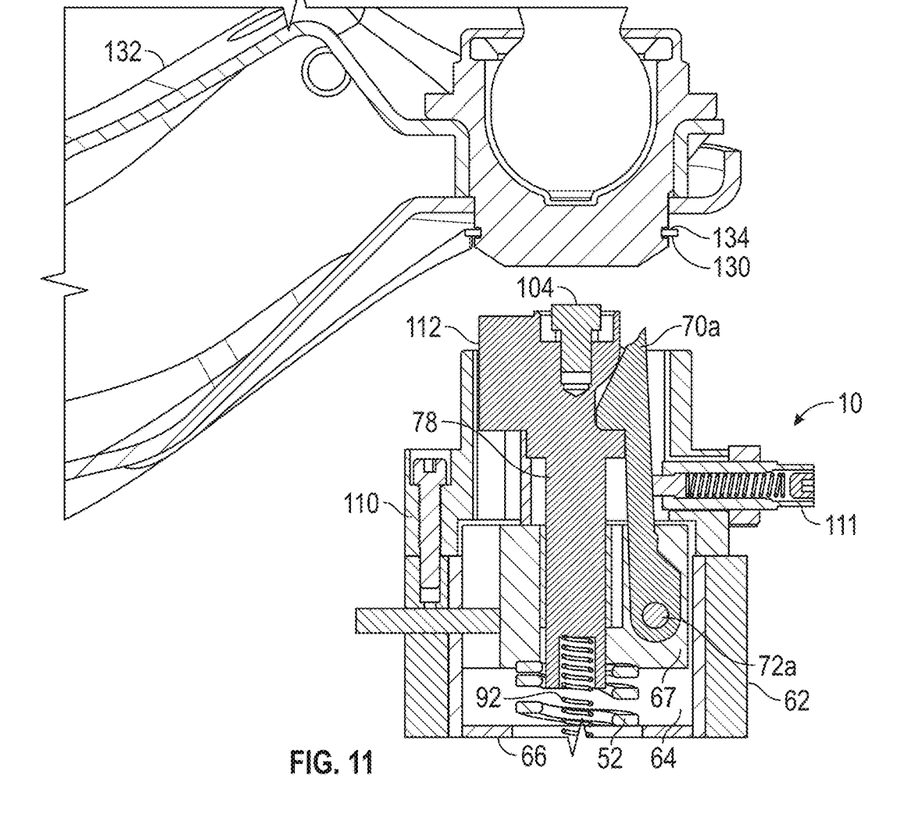
FIG. 11 is a front view of the snap ring insertion apparatus of FIG. 1 illustrating a final step in the snap ring installation process.

Referring now to FIG. 11, the structural member 132, having the installed snap ring 130 is separated from the insertion apparatus 10, thereby completing the installation process. As a final step in the process, the components of the pneumatic cylinder assembly 12 and the insertion assembly 14 are returned to their initial arrangement as described above and shown in FIG. 6.

Referring again to FIG. 1, the pneumatic cylinder assembly 12 is utilized to force the insertion assembly 14 in an upward direction. It should be apparent that adjustment of the pneumatic cylinder assembly 12 allows variable movement of the insertion assembly 14, thereby allowing installation of the snap ring at varying groove depths.

Referring again to FIGS. 4 and 5, the tips 126 of the fingers 70a-70c form a desired tip diameter DF. The plurality of adjuster assemblies 111 is configured to control an outward travel of a tip 126 of the finger 70a such that the plurality of fingers 70a-70c form a desired tip diameter DF. By controlling the desired tip diameter DF, snap rings of various sizes can be accommodated.

The snap ring insertion apparatus provides significant benefits, however, all benefits may not be available in all embodiments. First, the snap ring insertion apparatus provides for installation of snap rings without manual intervention, thereby providing efficiency, consistency and labor savings. Second, the snap ring insertion apparatus provides for adjustment of the radial expansion of the snap ring, thereby allowing various sizes of snap rings to be utilized. Third, the snap ring insertion apparatus provides for adjustment of the movement of the insertion assembly, thereby the snap ring to be installed at varying depths on the receiving structural member.

The principle and mode of operation of the snap ring insertion apparatus have been described in certain embodiments. However, it should be noted that the snap ring insertion apparatus may be practiced otherwise than as specifically illustrated and described without departing from its scope.

What is claimed is:

1. A snap ring insertion apparatus configured to install a snap ring on a structural member, the snap ring insertion apparatus comprising:
   a pneumatic cylinder assembly configured to receive compressed gas and transfer a power of an expansion of the compressed gas to linear movement of a rod; and
   an insertion assembly coupled to the rod, the insertion assembly having an expander pin and a plurality of fingers pivotably coupled to a finger support member, the finger support member coupled to the rod in a manner such that linear movement of the rod provides linear movement of the expander pin and pivoting movement of the fingers, wherein pivoting movement of the fingers results in engagement of the fingers with a snap ring and further pivoting of the fingers results in an expansion of the snap ring in a radial direction.

2. The snap ring insertion apparatus of claim 1, wherein a first spring member is disposed within a first internal cavity of the insertion assembly and is configured to support the finger support member.

3. The snap ring insertion apparatus of claim 1, wherein a pin member is disposed within a first internal cavity of the insertion assembly and is configured to support a second spring member.

4. The snap ring insertion apparatus of claim 3, wherein the second spring member extends into an internal cavity of the expander pin and is configured to support the expander pin.

5. The snap ring insertion apparatus of claim 1, wherein the expander pin includes a collar extending in a radial direction and configured for slidable contact with an internal surface of a nesting structure.

6. The snap ring insertion apparatus of claim 1, wherein the expander pin includes a radiused lower segment configured to receive a portion of one of the fingers.

7. The snap ring insertion apparatus of claim 6, wherein each of the fingers includes an outwardly radiused projection configured to seat in the radiused lower segment of the expander pin.

8. The snap ring insertion apparatus of claim 1, wherein the expander pin includes a radiused upper segment configured slidable engagement with a portion of one of the fingers.

9. The snap ring insertion apparatus of claim 1, wherein each of the fingers includes an angled surface configured to slide along a radiused upper segment of the expander pin.

10. The snap ring insertion apparatus of claim 1, wherein in an initial position the plurality of fingers form a finger diameter that is less than an internal diameter of the snap ring.

11. The snap ring insertion apparatus of claim 10, wherein with the fingers in a pivoted orientation, the internal diameter of the snap ring is greater than the diameter of a receiving groove of the structural member.

12. The snap ring insertion apparatus of claim 10, wherein an adjuster assembly is configured to adjust the finger diameter of the plurality of fingers in the initial position.

13. The snap ring insertion apparatus of claim 1, wherein the expander pin is configured to linear movement relative to the finger support member.

14. The snap ring insertion apparatus of claim 1, wherein an adjusting member is disposed in an upper portion of the expander pin and configured to contact a lower surface of the structural member receiving the snap ring.

15. A method of using a snap ring insertion apparatus to insert a snap ring into a groove of a structural member, the method comprising the steps of:
   producing linear movement of a rod with a pneumatic cylinder assembly configured to receive compressed gas and transfer a power of an expansion of the compressed gas to linear movement of the rod;
   connecting the rod to an insertion assembly, the insertion assembly having an expander pin and a plurality of fingers pivotably coupled to a finger support member;
   moving the expander pin in a linear direction with the rod;
   pivoting the plurality of fingers with the expander pin;
   expanding a diameter of the snap ring in a radial direction with the pivoting of the plurality of fingers thereby forming an expanded snap ring; and
   moving the structural member into a position to receive the expanded snap ring.

16. The method of claim 15, including the step of adjusting a diameter of the plurality of fingers in an initial position that is less than an internal diameter of the snap ring.

17. The method of claim 15, including the step of disposing a first spring member within a first internal cavity of the insertion assembly for supporting the finger support member.

18. The method of claim 15, including the step of extending a second spring member into an internal cavity of the expander pin for supporting the expander pin.

19. The method of claim 15, including the step of sliding an angled surface of each of the plurality of fingers against a radiused outer surface of the expander pin to effect the pivoting movement of the plurality of fingers.

20. The method of claim 15, including the step of moving the expander pin in a linear direction relative to the finger support member.

* * * * *